US009013500B2

(12) United States Patent
Moody et al.

(10) Patent No.: US 9,013,500 B2
(45) Date of Patent: Apr. 21, 2015

(54) REAL TIME INTERVISIBILITY ANALYSIS

(71) Applicant: The Boeing Company, Chicago, IL (US)

(72) Inventors: Marc D. Moody, Gold Canyon, AZ (US); Robert A. Fisher, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 277 days.

(21) Appl. No.: 13/657,701

(22) Filed: Oct. 22, 2012

(65) Prior Publication Data

US 2014/0111533 A1 Apr. 24, 2014

(51) Int. Cl.
| | | |
|---|---|---|
| *G06T 11/00* | (2006.01) | |
| *G06T 15/20* | (2011.01) | |
| *G06T 15/80* | (2011.01) | |
| *G06T 19/00* | (2011.01) | |
| *G06T 15/04* | (2011.01) | |
| *G01C 21/36* | (2006.01) | |
| *G06T 15/00* | (2011.01) | |

(52) U.S. Cl.
CPC .............. *G06T 15/04* (2013.01); *G06T 15/005* (2013.01); *G06T 11/001* (2013.01); *G06T 19/006* (2013.01)

(58) Field of Classification Search
USPC ......... 345/418–419, 426, 581, 582, 501–505, 345/506, 552; 382/254, 274, 285–286, 291, 382/304–307; 701/36, 412, 436, 438–439, 701/458–460, 307; 463/2, 30–31
See application file for complete search history.

(56) References Cited

U.S. PATENT DOCUMENTS

| | | | |
|---|---|---|---|
| 4,970,682 A | 11/1990 | Beckwith, Jr. et al. | |
| 5,787,333 A | 7/1998 | Rasinski et al. | |
| 5,838,262 A | 11/1998 | Kershner et al. | |
| 7,756,635 B2 | 7/2010 | Milbert | |
| 2005/0012744 A1* | 1/2005 | Jardin et al. ................... | 345/421 |
| 2005/0052451 A1* | 3/2005 | Servantie ....................... | 345/419 |
| 2010/0091018 A1* | 4/2010 | Tatarchuk et al. ............. | 345/423 |
| 2010/0141666 A1* | 6/2010 | Christopher et al. .......... | 345/520 |
| 2013/0265309 A1* | 10/2013 | Goel et al. ..................... | 345/426 |
| 2014/0002458 A1* | 1/2014 | Angelidis et al. ............. | 345/426 |

OTHER PUBLICATIONS

Chao et al., Parallel Algorithm for Viewshed Analysis on a Modern GPU, Feb. 17, 2011, International Journal of Digital Earth, vol. 4, pp. 471-486.*
FlightScene® Digital Moving Map Software, www.govcomm.harris.com/solutions/products/avionics/flitescene.asp.

* cited by examiner

*Primary Examiner* — Wesner Sajous
(74) *Attorney, Agent, or Firm* — Hugh P. Gortler

(57) ABSTRACT

A method comprises supplying textures and location information to a graphics processing unit. The textures represent elevation data of obstructions in an environment. The location information indicates locations of an object in the environment and a reference point. The method further comprises using a plurality of shader units of the graphics processing unit in parallel to process the texture to determine intervisibility between the object and the reference point.

30 Claims, 6 Drawing Sheets

REAL TIME INTERVISIBILITY ANALYSIS

BACKGROUND

Intervisibility analysis may be performed to identify line of sight with respect to terrain for threats in hostile environments. For example, as an aircraft flies over an environment containing surface-to-air missiles, intervisibility analysis may be used to inform the aircraft about the location of the missiles.

Intervisibility analysis may be performed on a central processing unit (CPU) of a computer. The CPU may be programmed to radially traverse an altitude database and store results (visible, not visible) in an array. The array is then loaded into texture memory of a graphics processing unit for visual display.

However, intervisibility analysis is computationally intensive. Consequently, real time analysis is difficult to achieve, especially for threats located in dense terrain.

SUMMARY

According to an embodiment herein, a method comprises supplying textures and location information to a graphics processing unit. The textures represent elevation data of obstructions in an environment. The location information indicates locations of an object in the environment and a reference point. The method further comprises using a plurality of shader units of the graphics processing unit in parallel to process the texture to determine intervisibility between the object and the reference point.

According to another embodiment herein, a system comprises a graphics processing unit including a plurality of shader units programmed to process textures representing elevation information of obstructions in an environment to determine whether line of sight between a reference location and an object in the environment is obstructed.

According to another embodiment herein, a vehicle comprises a graphics processing unit having a plurality of shader units programmed to determine intervisibility of an object in an environment with respect to the vehicle.

These features and functions may be achieved independently in various embodiments or may be combined in other embodiments. Further details of the embodiments can be seen with reference to the following description and drawings.

DETAILED DESCRIPTION

Figure 1:
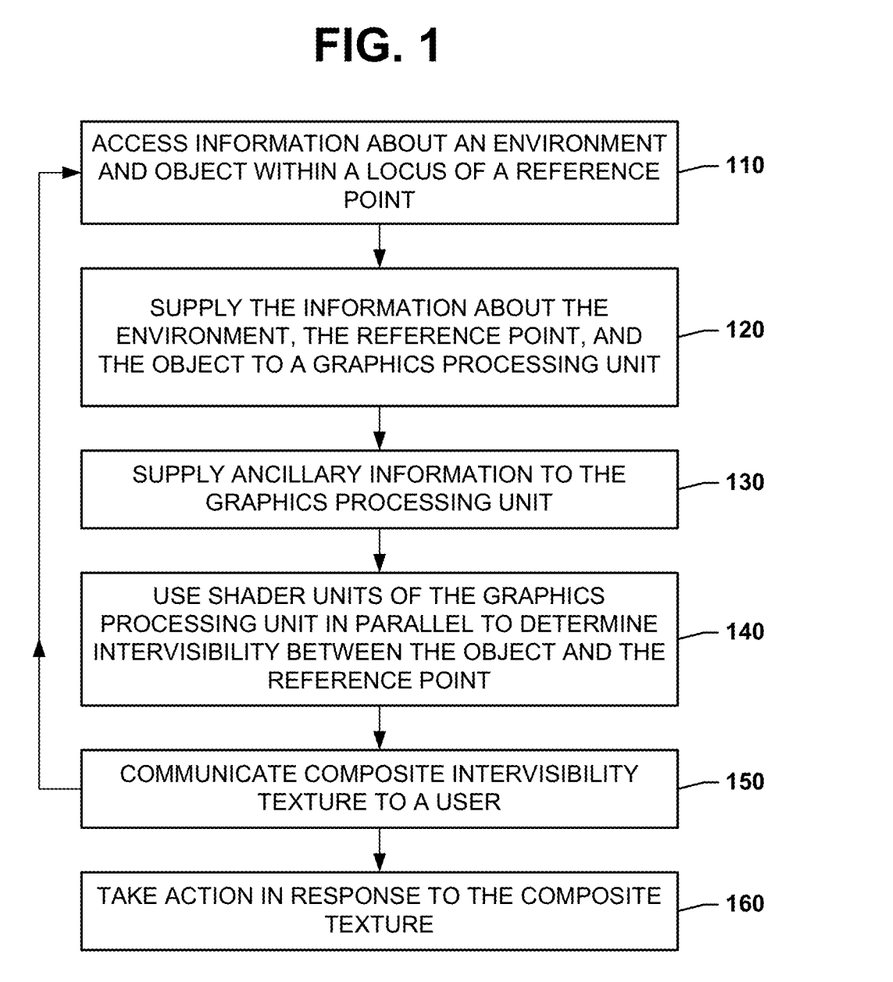
FIG. 1 is an illustration of a method of using a graphics processing unit to determine intervisibility between an object in an environment and a reference point.

Reference is made to FIG. 1, which illustrates a method of determining intervisibility between a reference point and an object in an environment. Intervisibility refers to mutually visible sight. The reference point may be within or outside the environment. The reference point may move across the environment as the method is being performed. The reference point may correspond, for example, to a person, a vehicle or component thereof, an Intelligence base, or an operations center.

The environment may include one or more objects. In a tactical environment, the object might be a target or it might be a friend or foe. To simplify the description of FIG. 1, only a single reference point and a single object will be described.

The environment may contain natural and artificial obstructions, which can obstruct the line of sight between the reference point and the object. Natural obstructions may include fixed obstructions (e.g., mountains and other terrain) and transitory obstructions. Artificial obstructions may include be fixed obstructions (e.g., buildings) and transitory obstructions.

Intervisibility may be determined as follows. At block 110, information about the environment within a locus of the reference point is accessed. In some embodiments, terrain and other fixed obstructions in the environment may have been previously scanned (e.g., during reconnaissance, mapping) and stored. Transitory obstructions may be determined from current sensor information. This information may be encoded as textures that can be processed by a graphics processing unit. Textures may include numerical values representing elevation data, such as elevation data of terrain and other obstructions. The textures may be stored in a real time terrain database, and textures within the locus of the reference point may be accessed from the real time terrain database.

Information about the reference point may be determined in real time. For example, if the reference point corresponds to an airborne platform, position and attitude about the airborne platform may be provided by onboard sensors (e.g., GPS) or remote sensors.

Also at block 110, information about the object is accessed. The object information may include location and type of the object. This information may have already been determined (e.g., during reconnaissance, mapping) or it may be obtained in real time. Sensors (e.g., visible and infrared imaging devices, digital communications, RADAR, LADAR) may be used to reveal the position and altitude of the object in the environment. Image recognition software may be used to identify the type of object. The image recognition may also be used to identify the object as friend or foe.

At block 120, the information about the environment, the object and the reference point are supplied to a graphics processing unit. The information about the environment may be supplied as textures.

At block 130, ancillary information may be supplied to the graphics processing unit. For example, if the object includes a weapons system or if the reference point corresponds to a vehicle armed with a weapons system, the ancillary information may include at least one of lethality and detection range of the weapons system. Other ancillary information may include colors for depiction of detection, lethality or hidden surfaces, and a minimum range with starting and ending angles.

At block 140, a plurality of shader units of the graphics processing unit are used in parallel to determine intervisibility between the object and the reference point. The shader units are programmed to determine whether a line of sight between the reference point and the object is obstructed by the environment. An output of the graphics processing unit includes a composite texture indicating line of sight between the object and the reference point.

If ancillary additional information such as lethality and detection range of a weapons system are also supplied to the graphics processing unit, the shader units may be programmed to compute intervisibility from the reference point (see FIG. 2A) or object (see FIG. 2B) to every point in the environment within a maximum of the lethality or detection range and classify it as lethality or detection. Color coding may be applied to the composite texture based on lethality and detection range of the weapons system, whether the weapons system is hidden, etc. Examples of composite textures showing lethality and detection ranges are illustrated in FIGS. 2A and 2B.

Figure 2A:
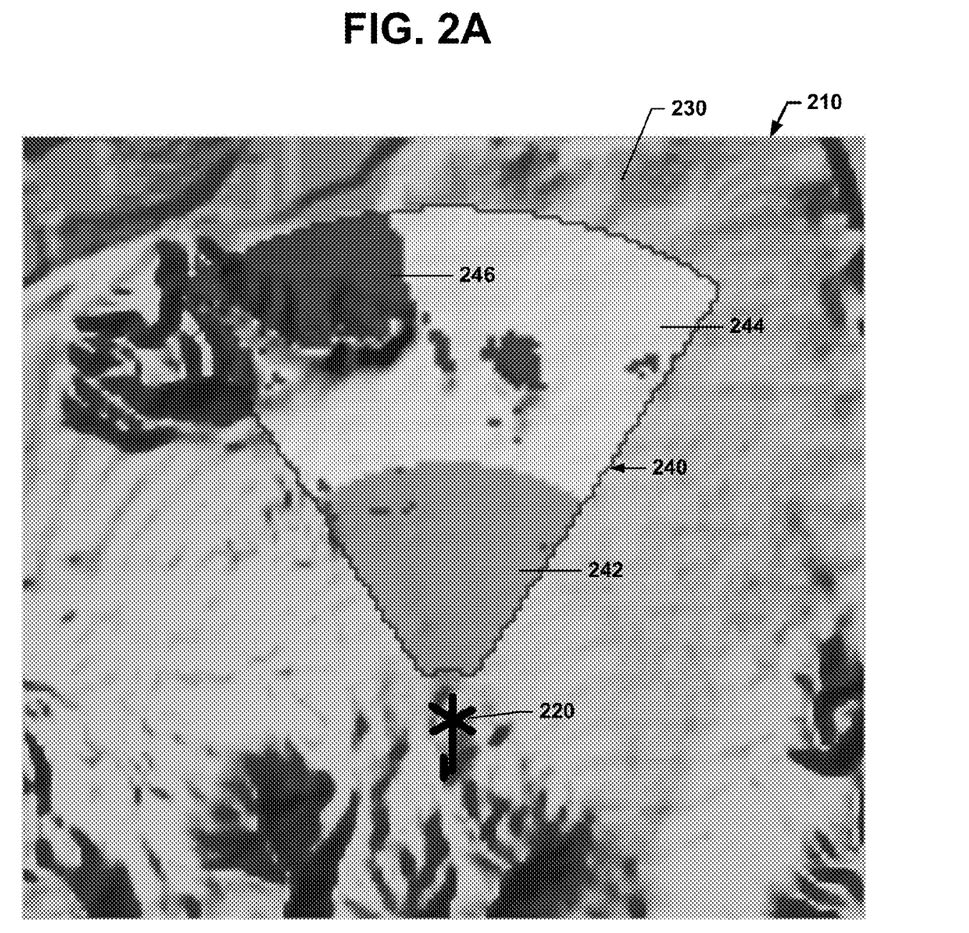
FIGS. 2A and 2B are illustrations of examples of composite textures generated by the graphics processing unit.

FIG. 2A shows composite texture 210 with respect to an aircraft 220 (reference point) flying over terrain (environment) 230. The aircraft 220 is equipped with missiles having a known lethality and detection range. The composite texture 210 includes a wedge 240 of approximately 60 degrees. The wedge 240, which projects outward from the aircraft 220, represents a missile launch radii from the aircraft 220. A minimum range is used to depict that the aircraft's pilot cannot see through the fuselage to the ground below; hence the distance from the aircraft 220 to the wedge 240.

The wedge 240 is represented with minimum range, detection, lethality and hidden colors. The mid-gray region 242 within the wedge 240 represents the lethality range, and the light gray region 244 represents the detection range. The dark gray region 246 represents pixels that are obstructed by the terrain 230. From the perspective of the aircraft 220 displayed below the wedge 240, the shaded regions 242-246 are what the pilot can see at the current aircraft location and attitude.

Figure 2B:
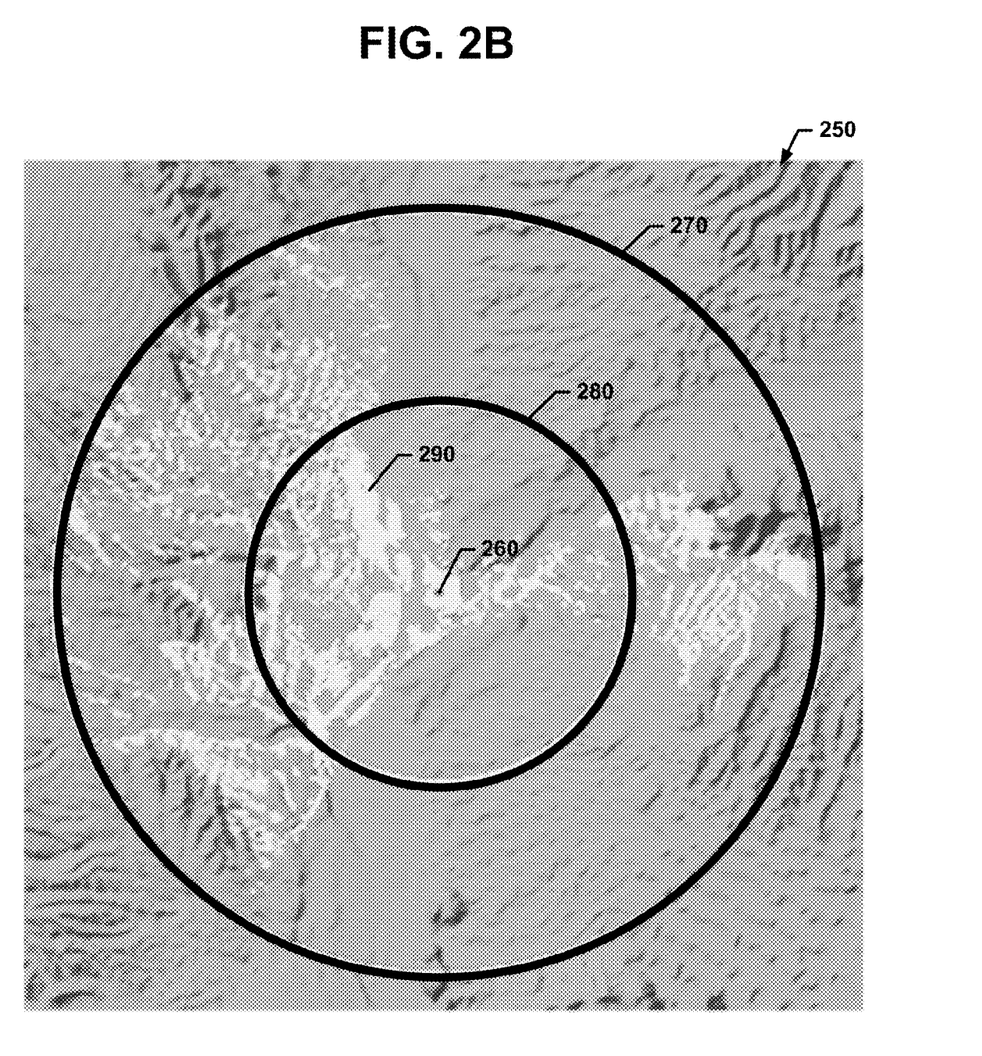

FIG. 2B shows a composite texture 250 representing a ground threat (object) 260 with respect to an aircraft (not shown). An outer circle 270 represents detection range of a ground-based weapons system, and the inner circle 280 represents lethality of the weapons system. In some embodiments, the graphics processing unit could use coloration of the circles 270 and 280 and shading 290 within to represent threats. For example, yellow coloration may indicate the threat as a warning, orange coloration may indicate that the aircraft has penetrated the detection range of the threat, and red coloration may indicate the aircraft has penetrated the lethality range of the threat.

Reference is once again made to FIG. 1. At block 150, the composite intervisibility texture is communicated to a user. For example, the composite texture 250 of FIG. 2B may be visually displayed to an operator of the aircraft. By visually identifying a threat that the operator can see with respect to the terrain, the composite texture 250 provides real time situational awareness.

As the reference point moves across the environment, the graphics processing unit updates the composite texture by returning control to block 110. The composite texture may be updated as frequently as needed. For example, if the composite texture is being displayed on a monitor having a refresh rate of 60 Hz, the composite texture may be updated at a rate of 60 Hz. More generally, the refresh rate of the composite texture may be a function of GPU performance, memory bandwidth, and the number of available shader units in the graphics processing unit.

In practice, more than one object may be in the environment. The method of FIG. 1 may be used to determine intervisibility between the reference point and each object, and represent each line of sight in the composite texture.

At block 160, an action may be taken in response to the composite texture. For an airborne platform, an operator may take evasive action.

Other possible actions include collision avoidance, mission (tactical) planning, situational awareness, dynamic route planning, and search and rescue coverage. Still other possible actions include, without limitation, police surveillance, optimal troop movement through a minimally visible path, cell tower placement with maximal intervisibility, and road planning.

Figure 3:
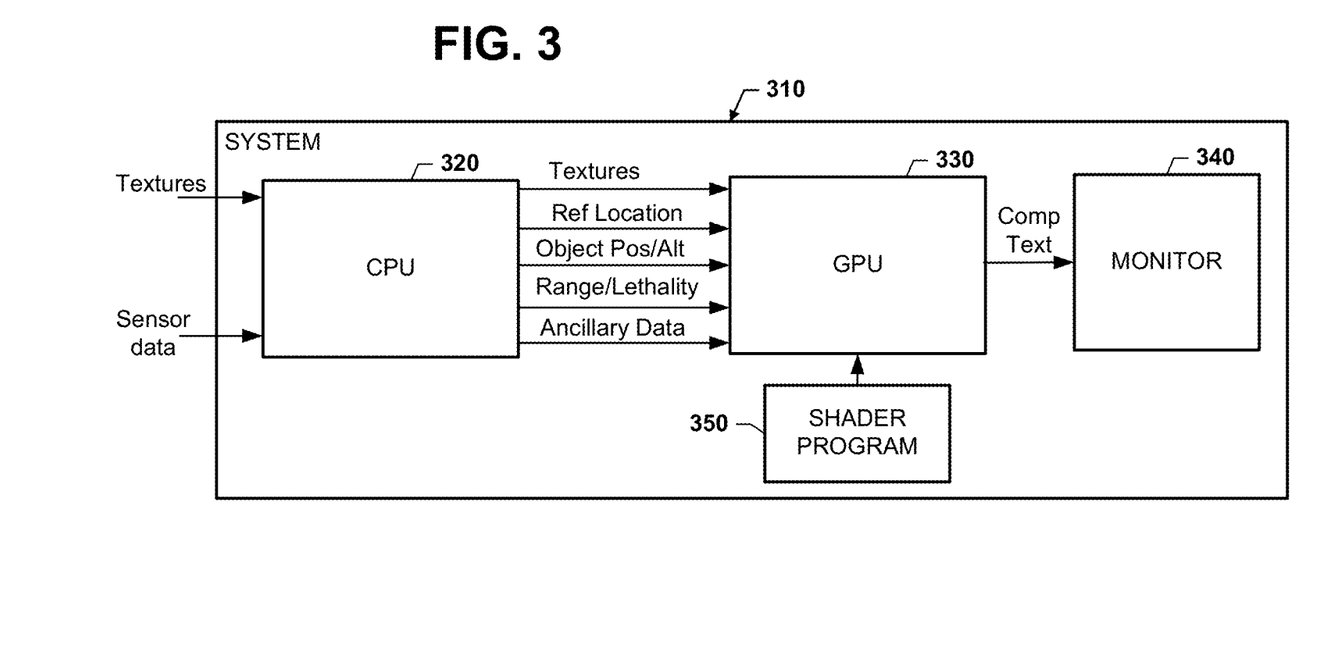
FIG. 3 is an illustration of a system for determining intervisibility between an object in an environment and a reference point.

Reference is made to FIG. 3, which illustrates an example of a system 310 for determining intervisibility between a reference point and an object in an environment. The system 310 includes a central processing unit (CPU) 320 and at least one graphics processing unit (GPU) 330. The CPU 320 may be programmed to receive sensor data about the reference point and the object and retrieve textures representing the environment within a locus of the reference point. The CPU 320 may be further programmed to supply some or all of the following inputs to the GPU 330: (1) textures; (2) reference point location (e.g., position, altitude and orientation); (3) object locations (e.g., position and elevation); (4) detection and/or lethality ranges of the objects; and (5) ancillary data, such as colors for depiction of detection, lethality, and hidden surfaces.

Each GPU 330 may have a number N of multiprocessors, each of which executes in parallel with the others. Each multiprocessor may have a group of M stream processors or cores. Thus, the GPU 330 may have a total of N×M cores that can be executed in parallel.

Each core is assigned a group of pixels. These N×M cores enable the GPU 330 to process independent vertices and fragments in parallel.

The GPU 330 outputs a composite texture. The composite texture may be visually displayed on a monitor 340.

General-purpose computing on graphics processing units (GPGPU) enables the GPU 330 to perform computations that would otherwise be handled by the CPU 320. The GPU 330 may be programmed with a shader program 350 that causes the shader units to execute an intervisibility algorithm. A shader program in general is an executable set of instructions written in a high level programming language that is loaded on a GPU and executes on vertex and texture data sent to the GPU for visualization and computation. The shader units may also be programmed to compute color and other attributes of each pixel.

Figure 4:
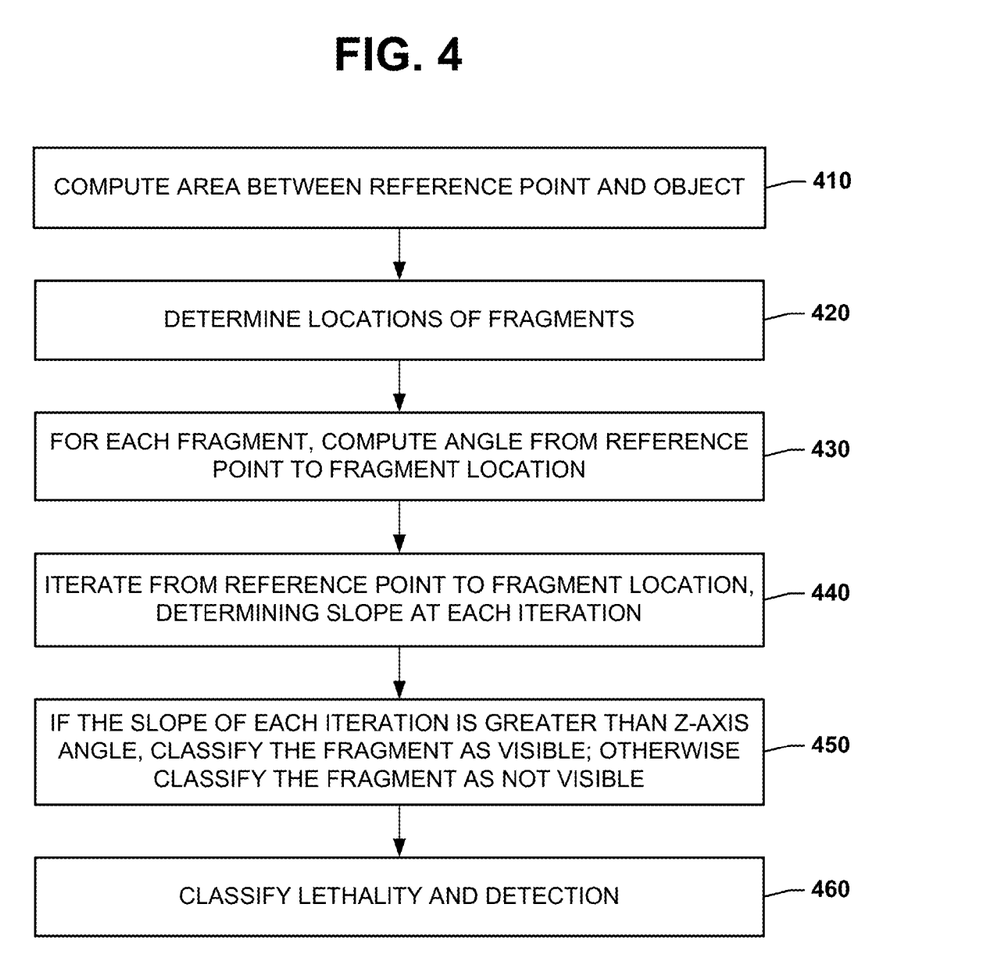
FIG. 4 is an illustration of an example of an intervisibility shadier program.

Additional reference is made to FIG. 4, which illustrates an example of a shader program for determining intervisibility between a reference point and an object in an environment. At block 410, an area between the reference point and the object is computed. For example, the area may include a wedge extending from the reference point towards the object. The wedge may be defined by a distance and arc limits with respect to the reference point.

At block 420, locations of fragments are identified. Each core will process a fragment. As part of block 420, offsets into the input textures are derived for the reference point and the fragments. These offsets enable elevation at a point to be determined. Distance between points on the elevation texture may also be determined at block 420.

Each fragment is iterated by the GPU 330 to calculate intervisibility over the entire area. The processing of a fragment includes computing an angle in the z-axis from the reference point to the fragment location (block 430), and iterating incrementally from the reference point to the fragment location, calculating a slope from the reference point to each iterated location (block 440). Slope may be calculated, for instance, as the arc-tangent of the change in elevation divided by the distance. If the slope of each iteration is greater than the angle, then the fragment is classified as visible; otherwise, it is classified as not visible (block 450).

Classification of lethality and detection may be performed (block 460) by calculating the distance from the reference point to the fragment. If the distance is within the lethality range and visible, the fragment is colored with the lethality color. If the distance is within the detection range and visible, the detection color is used.

The system 310 may be implemented in one or more computers having a CPU 320 and at least one GPU 330. Multiple graphics cards in one computer, or large numbers of graphics chips, further parallelizes the processing. The computer(s) may be at the reference point or at a remote location.

The system 310 unloads the processing burden from the CPU 320 onto the shader units of the GPU 330. By tapping the parallel processing power of the GPU 330, intervisibility analysis can be performed in real time. The system is especially useful for analyzing intervisibility of reference points that correspond to fast-moving vehicles such as airborne platforms traveling over dense terrain.

Figure 5:
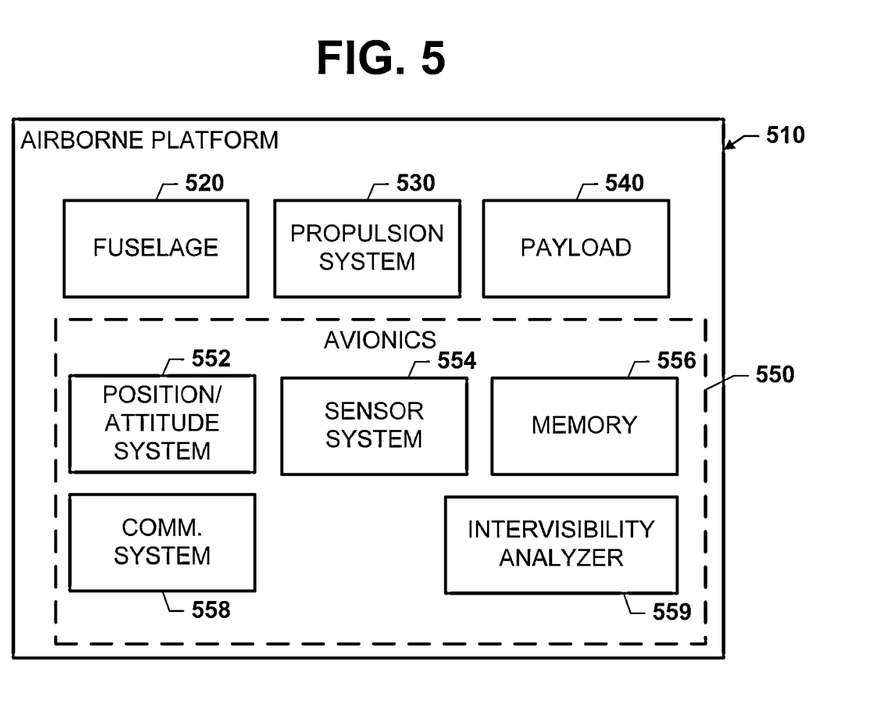
FIG. 5 is an illustration of a vehicle including a system for determining intervisibility between an object in an environment and a reference point.

Reference is made to FIG. 5, which illustrates an example of a vehicle capable of performing a real time intervisibility analysis. In this example, the vehicle is an airborne platform 510 (e.g., an aircraft, helicopter). The airborne platform 510 may be manned, remotely controlled, or autonomous. The airborne platform 510 includes a fuselage 520, propulsion system 530, and payload 540. In some embodiments, the payload 540 may include a weapons system. The fuselage 520 houses aircraft avionics 550. The avionics 550 may include a system 552 for indicating position and attitude (heading, pitch, roll, yaw) of the airborne platform 510, a sensor system 554 for providing the position of objects relative to the airborne platform 510, memory 556 for storing information about pre-planned targets/threats, and a communications system 558 for communicating with a real time terrain database 560. The avionics 550 further includes an intervisibility analyzer 559 including a graphics processing unit that has plurality of shader units programmed to determine intervisibility of an object in an environment with respect to the airborne platform 510.

The invention claimed is:

1. A method comprising:
   supplying textures and location information to a graphics processing unit, the textures representing elevation data of obstructions in an environment, the location information indicating locations of an object in the environment and a reference point; and
   using a plurality of shader units of the graphics processing unit in parallel to process the texture to determine intervisibility between the object and the reference point.

2. The method of claim 1, wherein the obstructions include terrain;
   and wherein the textures are accessed from a real time terrain database.

3. The method of claim 1, wherein the textures are within a locus of the reference point.

4. The method of claim 1, further comprising using sensors to sense the location of the object in real time.

5. The method of claim 1, wherein the textures are processed to determine whether a line of sight between the reference point and the object is obstructed by the environment.

6. The method of claim 5, wherein the graphics processing unit outputs a composite texture indicating the line of sight.

7. The method of claim 6, wherein the reference point corresponds to a weapons system; and wherein the line of sight is projected from the weapons system towards the object.

8. The method of claim 6, wherein the line of sight is projected from the object towards the reference point.

9. The method of claim 6, wherein at least one of lethality and detection range of a weapons system are also supplied to the graphics processing unit; and wherein at least one of lethality and detection range are represented in the line of sight.

10. The method of claim 6, further comprising visually displaying the composite texture, and updating the composite texture as the reference point moves across the environment.

11. The method of claim 1, wherein the reference point corresponds to a vehicle moving across the environment.

12. The method of claim 1, wherein the reference point corresponds to an airborne platform moving above the environment.

13. The method of claim 1, further comprising using the determination of intervisibility to perform at least one of collision avoidance, mission planning, dynamic route planning, situational awareness, search and rescue coverage analysis, optimal troop movement through a minimally visible path, and cell tower placement with maximal intervisibility, and road planning.

14. A system comprising a graphics processing unit including a plurality of shader units programmed to process textures representing elevation information of obstructions in an environment to determine whether line of sight between a reference location and an object in the environment is obstructed.

15. The system of claim 14, further comprising a real time terrain database for supplying textures representing terrain in the environment.

16. The system of claim 14, further comprising means for acquiring information about the reference location and location of the object.

17. The system of claim 14, wherein the object is a weapons system;
   wherein the shader units are programmed to represent at least one of lethality and detection range in the line of sight between the weapons system and the reference location.

18. A vehicle comprising a graphics processing unit having a plurality of shader units, the shader units programmed to process textures to determine intervisibility of an object in an environment with respect to the vehicle, the textures representing elevation data and obstructions in the environment.

19. The vehicle of claim 18, wherein the shader units are programmed to process fragments of the textures in parallel.

20. The vehicle of claim 18, further comprising a weapons system, the shader units programmed to project a line of sight from the weapons system to the object.

21. The vehicle of claim 18, further comprising means for acquiring information about locations of the vehicle and the object.

22. The vehicle of claim 18, wherein the textures are within a locus of a reference point that corresponds to the vehicle.

23. The vehicle of claim 18, wherein the obstructions include terrain; and wherein the vehicle further comprises a communications system for accessing the textures from a real time terrain database.

24. The vehicle of claim 18, wherein the textures are processed to determine whether a line of sight between the vehicle and the object is obstructed by the environment.

25. The vehicle of claim 24, wherein the graphics processing unit outputs a composite texture indicating the line of sight and also situational awareness.

26. The vehicle of claim 25, wherein the graphics processing unit updates the composite texture as the vehicle moves across the environment.

27. The vehicle of claim 22, wherein each shader unit processes a fragment of the textures, including computing an angle in a z-axis from the reference point to a location of the fragment; iterating incrementally from the reference point to the fragment location, calculating a slope from the reference point to each iterated location; and classifying the fragment as visible if the slope of each iteration is greater than the angle.

28. The vehicle of claim 24, wherein the line of sight is projected from the object towards the vehicle.

29. The vehicle of claim 24, further comprising a weapons system, wherein at least one of lethality and detection range of the weapons system are also supplied to the graphics processing unit; and wherein at least one of lethality and detection range are represented in the line of sight.

30. The vehicle of claim 18, wherein the vehicle is an airborne platform.

\* \* \* \* \*